Patented Mar. 29, 1949

UNITED STATES PATENT OFFICE 2,465,776

NITRATED PRODUCTS OF DEHYDRATED PENTAERYTHRITOL

Joseph A. Wyler, Allentown, Pa., assignor to Trojan Powder Company, a corporation of New York No Drawing. Application July 10, 1946,
Serial No. 682,596

3 Claims. (Cl. 260—338)

This invention relates to nitrated products of dehydrated pentaerythritol, herein called 1,3-(2,2-dimethylol) propane monoxide, and explosive compositions containing them.

The compound 1,3-(2,2-dimethylol) propane monoxide is closely related to pentaerythritol. Its polymers are related in similar manner to polymers of pentaerythritol. The 1,3-(2,2-dimethylol) propane monoxide compounds differ from the corresponding pentaerythritol compounds in containing fewer hydroxyl groups in proportion to the number of carbon atoms present.

Compounds of this kind have been described in my co-pending application Ser. No. 668,774, filed May 10, 1946, now Patent No. 2,462,048 issued February 15, 1949. Compounds serving as the base for the manufacture of my new nitrates may be made as described in the said application.

This treatment in the preferred method involves separation of alcohol-soluble material by treatment with alcohol followed by dehydration and crystallization of the product.

In another embodiment the method includes concentrating an aqueous solution of the product first formed by the acid treatment of the pentaerythritol compound, continuing the concentration almost to the point of crystallization, and then adding a volatile liquid that is not a solvent for 1,3-(2,2 dimethylol) propane monoxide, as, for example, butanol, distilling the mixture, separating the condensate into an aqueous and non-aqueous layer, and returning the non-aqueous layer to the still until substantially all the water is removed. There results a suspension of crystals of pentaerythritol, its condensation products and 1,3-(2,2 dimethylol) propane monoxide in the liquid. When boiling is discontinued, the crystals of the penta compounds settle rapidly whereas the crystals of 1,3-(2,2 dimethylol) propane monoxide settle slowly. The suspension of the slowly settling 1,3-(2,2 dimethylol) propane monoxide is then decanted away from the crystals of the penta compound. The crystals of the 1,3-(2,2 dimethylol) propane monoxide so separated may then be further purified by recrystallization as from hot water.

Compounds made as described are considered to have the general structure shown in the following formula:

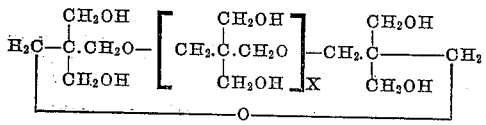

—in which X=one or any whole number. For the trimer X=1 and for the pentamer X=3. For the heptamer X=5.

The method will be further illustrated by detailed description in connection with the following specific examples.

EXAMPLE A

*Preparation of trimer of 1,3-(2,2 dimethylol) propane monoxide*

Pure pentaerythritol was heated with 0.2% of its weight of sulfuric acid at 200° to 235° C., with the liberation of water, until the OH content of the product was about 37%.

100 parts of this product were refluxed with 400 parts of ordinary commercial ethyl alcohol for about 2 hours and the hot mixture filtered. The filtrate was evaporated to dryness on the steam bath, taken up in hot water, decolorized by means of charcoal, filtered, and this filtrate placed in a suitable still and evaporated to small volume.

Just before any crystals are caused to separate during the evaporation, normal butyl alcohol is added in a steady stream in order to effect an azeotropic distillation, to dehydrate the mixture and to cause the separation of clean-cut crystals. By this procedure coarse crystals of pure pentaerythritol (unconverted in the original heating process) and fine crystals of the trimer of 1,3-(2,2 dimethylol) propane monoxide separate. The latter crystals are readily separated by decantation from the denser crystals of pentaerythritol, as by stirring the whole mixture and pouring off the suspended crystals as soon as the larger crystals have settled.

50 parts of this fine material were dissolved in 200 parts of hot water, the mixture cooled to room temperature and the crystals which form filtered off, washed and dried.

The trimer, 1,3-(2,2 dimethylol) propane monoxide, is a white pulverulent, crystalline product of M. P. about 208° C., somewhat soluble in ethyl alcohol, but less soluble in butyl alcohol, slightly soluble in cold water but more soluble in hot. It is more soluble in water containing some pentaerythritol than it is in pure water and appears to become somewhat hydroxylated upon prolonged heating in water. It is soluble in hot diethylene glycol and may be precipitated therefrom by means of ethyl alcohol or cold water.

Its formula may be written:

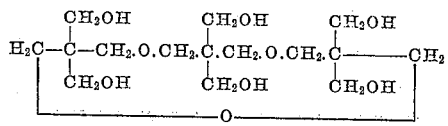

EXAMPLE B

*Preparation of the pentamer of 1,3-(2,2 dimethylol) propane monoxide*

Pure pentaerythritol was heated with 0.2% of its weight of sulfuric acid, with the liberation of water, at 200° to 235° C. to obtain a conversion product containing 38.05% OH. One part of this product was mixed with 14 parts of water and the mixture boiled for about one half hour. the hot (90° C.+) mixture was filtered away from the undissolved material and the clear filtrate allowed to cool to room temperature. The flocculent precipitate which formed was filtered off, washed with water, dried and pulverized.

The purified product contains no ketonic or aldehydic groups and was found to be the pentamer.

EXAMPLE C

*Preparation of the heptamer of 1,3-(2,2 dimethylol) propane monoxide*

Pure pentaerythritol was heated with 0.2% of its weight of sulfuric acid, with the liberation of water, to obtain a conversion product of OH content about 30%, say 28% to 32%.

One part of this product was mixed with 14 parts of water and the mixture boiled for about one-half hour. The hot (90° C.+) mixture was filtered and the residue repeatedly treated with boiling water and filtered at a temperature above 90° C., until a test of the clear filtrate indicated practically no hot water soluble material left in the residue. This repeated boiling in water removes the lower polymers which are relatively more soluble than the higher which are practically insoluble in water but soluble in hot glycerine or diethylene glycol from which they may be precipitated by means of ethyl alcohol, methyl alcohol, or water.

In the present example, in which a 30% OH conversion product was initially used, the final insoluble fraction obtained above was found to be the heptamer

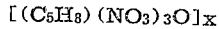

X being an integral number within the range 1 to 7.

In greater detail, the composition and structure of the nitrates may be represented by the following formula

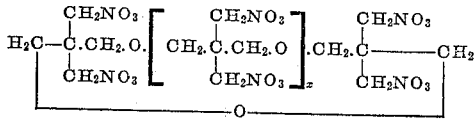

In this formula $x$ is zero or an integral number, preferably 1 to 5. When $x$ is 1 for instance, then this formula represents the trimer of 1,3-(2,2 dimethylol) propane monoxide. When $x$ is 3, then the formula represents the pentamer.

These nitrated compounds differ in composition from corresponding nitrated compounds of polypentaerythritol in that the two carbon atoms, at the left and the right ends of the formula, are joined through oxygen to each other, whereas in the nitrated polypentaerythritols those two carbons are not joined in this manner but are each joined to an additional nitrate radical $NO_3$.

The nitrates of pentaerythritol and also of polypentaerythritols have already been described for use in explosives. The pentaerythritol tetranitrate in fact has been in extensive use for several years. Tripentaerythritol octanitrate is described and claimed in Patent 2,389,228 issued to me on November 20, 1945. Tetrapentaerythritol decanitrate is described and claimed in abandoned application for U. S. Patent Ser. No. 650,387 filed by me on February 26, 1946.

On the basis of similarity of structures, it was to have been expected in advance of the present work that the nitrates of the 1,3-(2,2 dimethylol) propane monoxide derivatives, except for a minor difference in proportion of nitrate radical, would be similar in properties to the corresponding nitrates of the pentaerythritol derivative.

I have found, however, that this is not the case. the nitrated 1,3-(2,2 dimethylol) propane monoxide compounds are tacky. They cling much better to crystals of ammonium nitrate, sodium nitrate, and like salts that are common ingredients of explosives and they have lower melting points than do the corresponding nitrates of pentaerythritol and its polymers. Because my new nitrated compounds cling better to other ingredients of the explosive composition, there is no seepage and the safety factor is correspondingly increased.

I have also found that the nitrates of the 1,3-(2,2-dimethylol) propane monoxide derivatives of pentaerythritol, while themselves insensitive to shock, are powerful sensitizers for ammonium nitrate explosives.

Because of these properties and the water insolubility of these new nitrates, coupled with their adherence as tacky compounds over the surface of salts, the new compounds are also excellent sensitizing and waterproofing agents for ammonium nitrate and the like.

In making the nitrates of the present invention, I first select the particular 1,3-(2,2-dimethylol) propane monoxide to be nitrated, either the monomer or one of the polymers up to the one containing 7 units of the monomer per molecule. This compound is then added slowly with stirring to concentrated nitric acid, preferably of concentration about 80% to 100% and suitably 98%, while the whole is kept thoroughly stirred and cooled to and maintained at a low temperature, as in the neighborhood of 0° C., say about −10° to +15° C. The stirring with cooling is continued until the reaction is complete, when the whole is then drowned by being dropped into a large amount of vigorously stirred ice water. The nitrated product separates as a semi-viscous tacky liquid. This liquid is then washed with cold water and finally with a dilute aqueous solution of a weak alkali to promote the removal of the remaining free acid. A suitable alkali being sodium carbonate or bicarbonate, ammonium carbonate, or ammonium hydroxide.

The nitrated product is then further purified by being dissolved in a suitable water soluble solvent, then precipitated by stirring with an excess of water containing again a small amount of the weak alkali to neutralize remaining acid, and then washing with additional water.

The invention will be further illustrated by detailed description in connection with the following specific examples of the practice of it.

EXAMPLE 1

The nitrate of the trimer of 1,3-(2,2 dimethylol) propane monoxide was made as follows, proportions here and elsewhere herein being expressed as parts by weight unless otherwise specifically stated.

One part of the trimer, of the first formula given above in which $x$ is 3, was added slowly to about 9 parts of an aqueous solution of nitric acid containing 98% of actual $HNO_3$, the whole being stirred continuously and maintained by cooling at a temperature of −10° to +15° C. After the last of the trimer had been added, the stirring and cooling were continued for 30 minutes.

The resulting nitrated product along with remaining aqueous nitric solution was run with stirring into 50 parts of a mixture of ice and water. This drowning causes the precipitation of the nitrate which is the hexanitrate of the trimer, the precipitate being a viscous liquid which at ordinary temperatures is tacky.

This liquid was washed with several portions of cold water, then with a 1% aqueous solution of ammonium carbonate, and finally with water again. The final water washing was separated by causing the settling out of the hexanitrate by gravity and decanting off the water. The product was further purified and stabilized by being dissolved in acetone and then gradually adding and stirring in water containing a small amount of ammonium carbonate until addition of more water causes no substantial amount of additional precipitate of the hexanitrate. The whole is then settled, the aqueous solution decanted, and the hexanitrate washed several times with additional portions of water.

The product was then dried in air at ordinary temperatures. It was a viscous oil containing, by nitrometer determination, 13.46% of nitrogen, as compared to a theoretical nitrogen content of the same 13.46% calculated for compound of the formula for the nitrate given above in which $x$ is 1.

The molecular weight was determined approximately by the depression of the freezing point produced by the nitrate in a standard solvent, actually trinitrotoluene. The molecular weight was within several precent of the theory for the trimer.

The compound is freely soluble in ethylene dichloride or acetone, slightly soluble in chloroform, and insoluble in water, carbon tetrachloride, and ethyl ether. It did not freeze upon cooling to below $-10°$ C. so that it has excellent cold characteristics. It is stable. Also it does not produce headaches on the part of the one handling it.

Example 2

The nitrated pentamer of 1,3-(2,2 dimethylol) propane monoxide was made by replacing 1 part of the pentamer for one part of the trimer used as the starting material in Example 1, other details of the preparation being as there described.

The purified nitrated pentamer had physical characteristics similar to those obtained with the trimer. The nitrogen content as determined by nitrometer determination was found to be 13.42% to 13.49%, as determined on different specimens, the theory being 13.46% as above. The molecular weight was found to be slightly over 96% of calculated molecular weight of 1040.7 for the pentamer decanitrate.

In making nitrates of any of the other 1,3-(2,2 dimethylol) propane monoxide compounds in which X in the formula first given is 1, 2, 4, 6 or 7, the monoxide, in the form of the monomer or a polymer of the number of units of the monomer corresponding to the desired value of X, is substituted part for part in the trimer in the procedure of Example 1.

In general, all these products are of the properties described, are insensitive to shock, and are in themselves effective sensitizers for ammonium nitrate to which the compounds cling tenaciously because of their tackiness.

For best results in explosive compositions the compounds of the present invention are used in the proportion of 5 to 40 parts for each 100 parts by weight of ammonium nitrate. If used in proportions much below 5 parts, the desired sensitizing effect upon the ammonium nitrate is not obtained. If used in proportions substantially above 40 parts, the whole explosive composition is made sticky or there is a loss of sensitiveness over that imparted by slightly smaller proportions of the nitrated epoxy derivatives. In any case the ammonium nitrate explosives must contain a large amount of ammonium nitrate itself and smaller proportions of the nitrated 1,3-(2,2 dimethylol) propane monoxide derivatives.

The crystals of ammonium nitrate should be intimately mixed with the nitrated 1,3-(2,2 dimethylol) propane monoxide derivative, as by tumbling. This gives a good coating of the ammonium nitrate by the selected nitrated derivative with attendant sensitizing and protection against moisture.

It will be understood also that it is intended to cover all changes and modifications of the examples of the invention herein chosen for the purpose of illustration which do not constitute departures from the spirit and scope of the invention.

What I claim is:

1. The nitration product of dehydrated pentaerythritol, the nitration product being of the general formula $$[(C_5H_8)(NO_3)_2O]_X$$

in which X represents an integral number within the range 1 to 7.

2. The nitrated trimer of 1,3-(2,2 dimethylol) propane monoxide of the general formula given in claim 1, X being 3.

3. The nitrated pentamer of 1,3-(2,2 dimethylol) propane monoxide of the general formula given in claim 1, X being 5.

JOSEPH A. WYLER.

REFERENCES CITED

The following references are of record in the file of this patent:

UNITED STATES PATENTS

| Number | Name | Date |
|---|---|---|
| 1,660,651 | Marshall et al. | Feb. 28, 1928 |
| 2,294,592 | Wyler | Sept. 1, 1942 |
| 2,334,565 | Lieber et al. | Nov. 16, 1943 |
| 2,389,228 | Wyler | Nov. 20, 1945 |
| 2,407,805 | Wyler | Sept. 17, 1946 |